(Model.)

C. D. REYNOLDS.
COVER FOR SAP BUCKETS AND OTHER VESSELS.

No. 249,673.                                    Patented Nov. 15, 1881.

WITNESSES:

INVENTOR:
C. D. Reynolds
BY
ATTORNEYS.

UNITED STATES PATENT OFFICE.

CHARLES D. REYNOLDS, OF REVERE, MASSACHUSETTS.

COVER FOR SAP-BUCKETS AND OTHER VESSELS.

SPECIFICATION forming part of Letters Patent No. 249,673, dated November 15, 1881.

Application filed April 4, 1881. (Model.)

*To all whom it may concern:*

Be it known that I, CHARLES D. REYNOLDS, of Revere, in the county of Suffolk and State of Massachusetts, have invented a new Improvement in Covers for Sap-Buckets and other Vessels, of which the following is a full, clear, and exact description.

Figure 1:
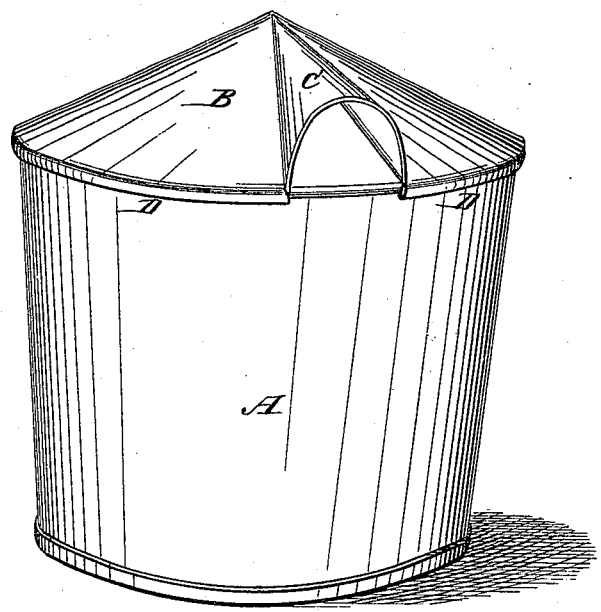
Figure 2:
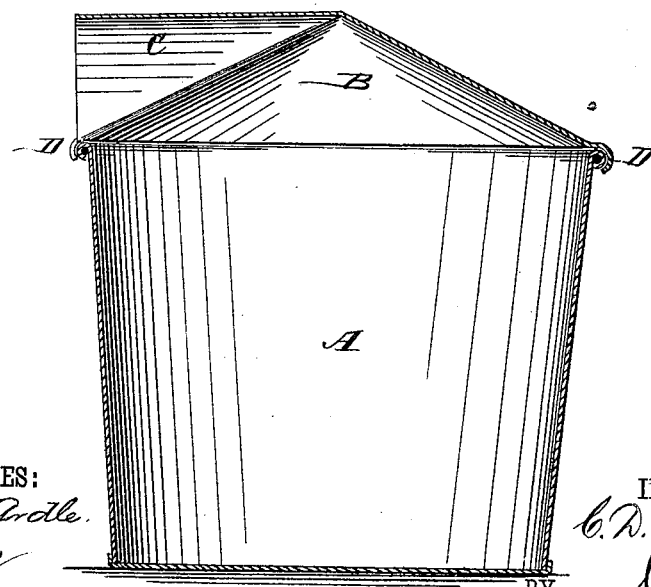

Figure 1 is a perspective view of my improvement, shown as applied to a sap-bucket. Fig. 2 is a sectional side elevation of the same.

The object of this invention is to facilitate the covering of sap-buckets and other vessels.

The invention consists in constructing a cover with an arched elastic projection and a downwardly-projecting rim, whereby the cover can be applied to vessels of different size and will be kept securely in place, as will be hereinafter fully described.

A represents a sap-bucket, about the construction of which there is nothing new.

B is the cover, which is made convex or slightly conical, as shown in Figs. 1 and 2. The cover B is made of sheet metal or other suitable material. In the cover B is formed an arched projection, C, which is made largest at the outer edge and gradually tapers to the apex of the cover. Around the edge of the cover B, except at the projection C, is formed a downwardly-projecting rim or flange, D, to receive the edge of the sap-bucket A or other vessel to be covered. The cover, with its arched projection, may be struck up from a single piece of sheet metal, or they may be made separately and soldered or otherwise secured together. With this construction the arched projection, C serves as a spring to allow the cover B to be applied to buckets varying in size and to cause the rim D to clasp the edge of the bucket, so that the cover will be held securely in place, and will not be liable to be blown off by the wind or otherwise accidentally removed. The arched projection C also receives, covers, and protects the sap-spout, and protects the notch, when the tree is tapped in that way, from having its surface dried and the pores closed by the sun.

With this construction covers of the same size can be used for covering buckets of different makers, and which differ somewhat in size.

By this improvement sugar-makers are enabled to protect their buckets from leaves and other impurities raised by the wind, and from rain and snow, thus saving the sugar-makers from the labor of going around to all their buckets and emptying them after each storm.

Having thus described my invention, what I claim as new, and desire to secure by Letters Patent, is—

1. As an improved article of manufacture, the cover B, constructed with an arched elastic projection, C, and a downwardly-projecting rim, D, substantially as herein shown and described, whereby the cover can be applied to vessels of different size and will be kept securely in place, as set forth.

2. The combination, with the vessel A, of the cover B, having arched elastic projection C and downwardly-projecting rim D, substantially as herein shown and described.

CHARLES DANIEL REYNOLDS.

Witnesses:
   CHAS. BIRD,
   HENRY TURNER.